United States Patent
Contreras

[19]

[11] Patent Number: 6,113,845
[45] Date of Patent: Sep. 5, 2000

[54] VERSATILE CUTTING TORCH SYSTEM

[76] Inventor: Manuel C. Contreras, P.O. Box 3346, Baytown, Tex. 77522

[21] Appl. No.: 09/078,625

[22] Filed: May 14, 1998

[51] Int. Cl.[7] .................................................. B23K 7/00

[52] U.S. Cl. .............................. 266/70; 266/48; 266/77

[58] Field of Search ........................... 266/48, 72, 77, 266/70, 73, 71, 58, 54

[56] References Cited

U.S. PATENT DOCUMENTS

| | | | |
|---|---|---|---|
| 774,456 | 11/1904 | Smith | 266/48 |
| 4,411,410 | 10/1983 | Sumner | 266/54 |

*Primary Examiner*—Scott Kastler

[57] ABSTRACT

A versatile torch assembly is provided including a base and a mounting arm coupled to the base. Also included is a plate rotatably mounted with respect to the mounting arm. A torch is mounted on the plate for cutting purposes.

9 Claims, 3 Drawing Sheets

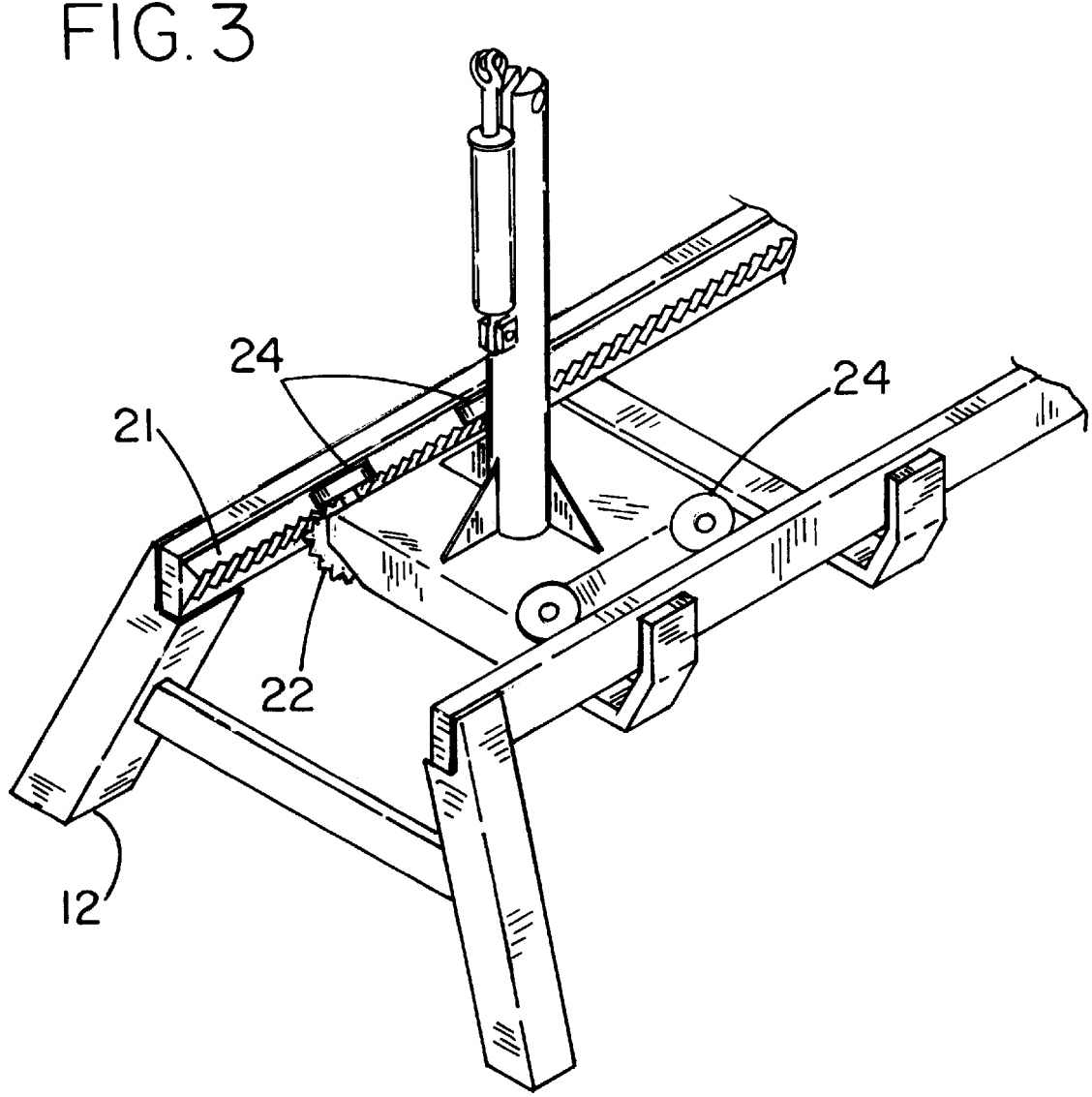

VERSATILE CUTTING TORCH SYSTEM

BACKGROUND OF THE INVENTION

1. Field of the Invention

The present invention relates to cutting torch assemblies and more particularly pertains to a new versatile cutting torch system for cutting various items in a versatile manner.

2. Description of the Prior Art

The use of cutting torch assemblies is known in the prior art. More specifically, cutting torch assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art cutting torch assemblies include U.S. Pat. Nos. 4,074,895; 4,854,493; 5,278,387; 5,436,423; 5,101,088; and U.S. Pat. No. Des. 273,496.

In these respects, the versatile cutting torch system according to the present invention substantially departs from the conventional concepts and designs of the prior art, and in so doing provides an apparatus primarily developed for the purpose of cutting items in a versatile manner.

SUMMARY OF THE INVENTION

In view of the foregoing disadvantages inherent in the known types of cutting torches now present in the prior art, the present invention provides a new versatile cutting torch system construction wherein the same can be utilized for cutting items in a versatile manner.

The general purpose of the present invention, which will be described subsequently in greater detail, is to provide a new versatile cutting torch system apparatus and method which has many of the advantages of the cutting torches mentioned heretofore and many novel features that result in a new versatile cutting torch system which is not anticipated, rendered obvious, suggested, or even implied by any of the prior art cutting torches, either alone or in any combination thereof.

To attain this, the present invention generally comprises a base including a central telescoping post mounted thereon. A top end of the post has a horizontally oriented table fixedly secured thereon. As shown in FIGS. 1 & 2, the table has a plurality of teeth formed on a top face thereof. In use, a height of the table is adjustable by way of a bolt. Next provided is a generally C-shaped mounting arm including a lower extent fixedly coupled to the base. An upper extent is pivotally coupled to the lower extent about a horizontal axis. For affording control over a lateral shifting of the upper extent with respect to the lower extent and the base, a hydraulic cylinder is mounted between the upper and lower extents. Also included is a vertical adjustment assembly including a sleeve pivotally mounted to a top of the mounting arm about a horizontal axis. Such horizontal axis is perpendicular with respect to that of the mounting arm. Further, the vertical adjustment assembly includes a hydraulic cylinder connected between the upper extent of the mounting arm and the sleeve. The vertical adjustment assembly further includes a linear rack gear slidably mounted within the sleeve. The linear rack gear is made adjustable by way of a rotating handle positioned on the sleeve. For supporting any weight present on the linear rack gear, a spring is connected between the sleeve and the linear rack gear. Rotatably mounted to a bottom of the linear rack gear is a planar circular plate which remains in concentric relationship therewith. It should be noted that the plate rotates about an axis of the linear rack gear. As shown in FIG. 1, a center point pin is fixedly mounted to a bottom of the linear rack gear below the plate and depends downwardly therefrom in concentric relationship with the circular plate. For reasons that will soon become apparent, the pin has a sharpened lower end. Also included is a rotating control unit including a radially extending bar having an inboard end fixedly mounted adjacent to a lower end of the linear rack gear. The radially extending bar extends from the linear rack gear in a spaced and parallel relationship with the circular plate. As shown in FIG. 1, the rotating control unit includes a roller wheel assembly movable along a length of the radially extending bar. During operation, a wheel of the roller wheel assembly engages with an upper surface of the circular plate for rotating the same. Finally, a torch is pivotally and slidably mounted on a radially extending member fixedly coupled to a lower surface of the circular plate. In use, the torch is angled downwardly for cutting purposes.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature an essence of the technical disclosure of the application. The abstract is neither intended to define the invention of the application, which is measured by the claims, nor is it intended to be limiting as to the scope of the invention in any way.

It is therefore an object of the present invention to provide a new versatile cutting torch system apparatus and method which has many of the advantages of the cutting torches mentioned heretofore and many novel features that result in a new versatile cutting torch system which is not anticipated, rendered obvious, suggested, or even implied by any of the prior art cutting torches, either alone or in any combination thereof.

It is another object of the present invention to provide a new versatile cutting torch system which may be easily and efficiently manufactured and marketed.

It is a further object of the present invention to provide a new versatile cutting torch system which is of a durable and reliable construction.

An even further object of the present invention is to provide a new versatile cutting torch system which is susceptible of a low cost of manufacture with regard to both materials and labor, and which accordingly is then susceptible of low prices of sale to the consuming public, thereby making such versatile cutting torch system economically available to the buying public.

Still yet another object of the present invention is to provide a new versatile cutting torch system which provides in the apparatuses and methods of the prior art some of the advantages thereof, while simultaneously overcoming some of the disadvantages normally associated therewith.

Still another object of the present invention is to provide a new versatile cutting torch system for cutting items in a versatile manner.

Even still another object of the present invention is to provide a new versatile cutting torch system that includes a base and a mounting arm coupled to the base. Also included is a plate rotatably mounted with respect to the mounting arm. A torch is mounted on the plate for cutting purposes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of an alternate embodiment of the present invention.

DESCRIPTION OF THE PREFERRED EMBODIMENT

Figure 1:
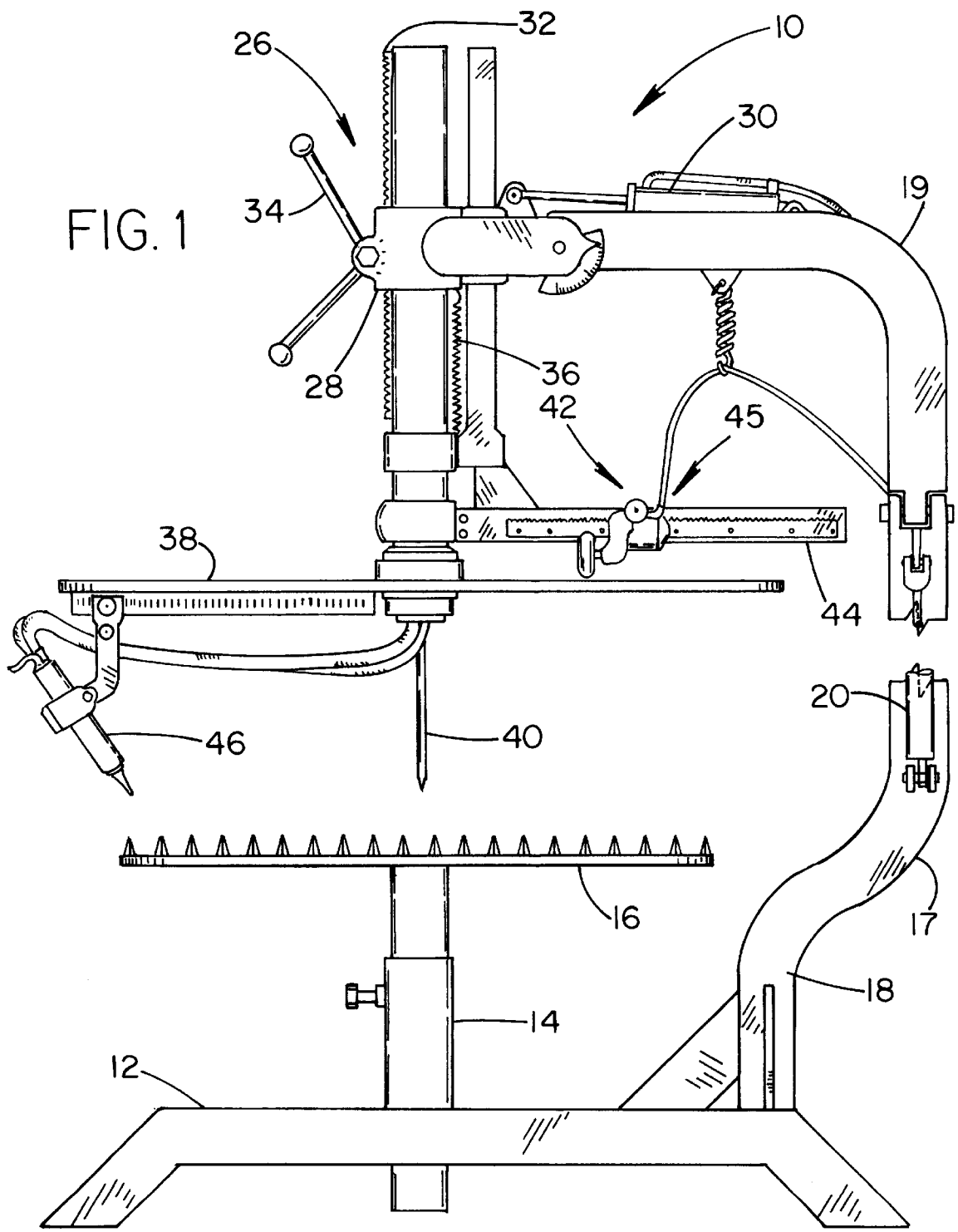
FIG. 1 is a front view of a new versatile cutting torch system according to the present invention.
Figure 2:
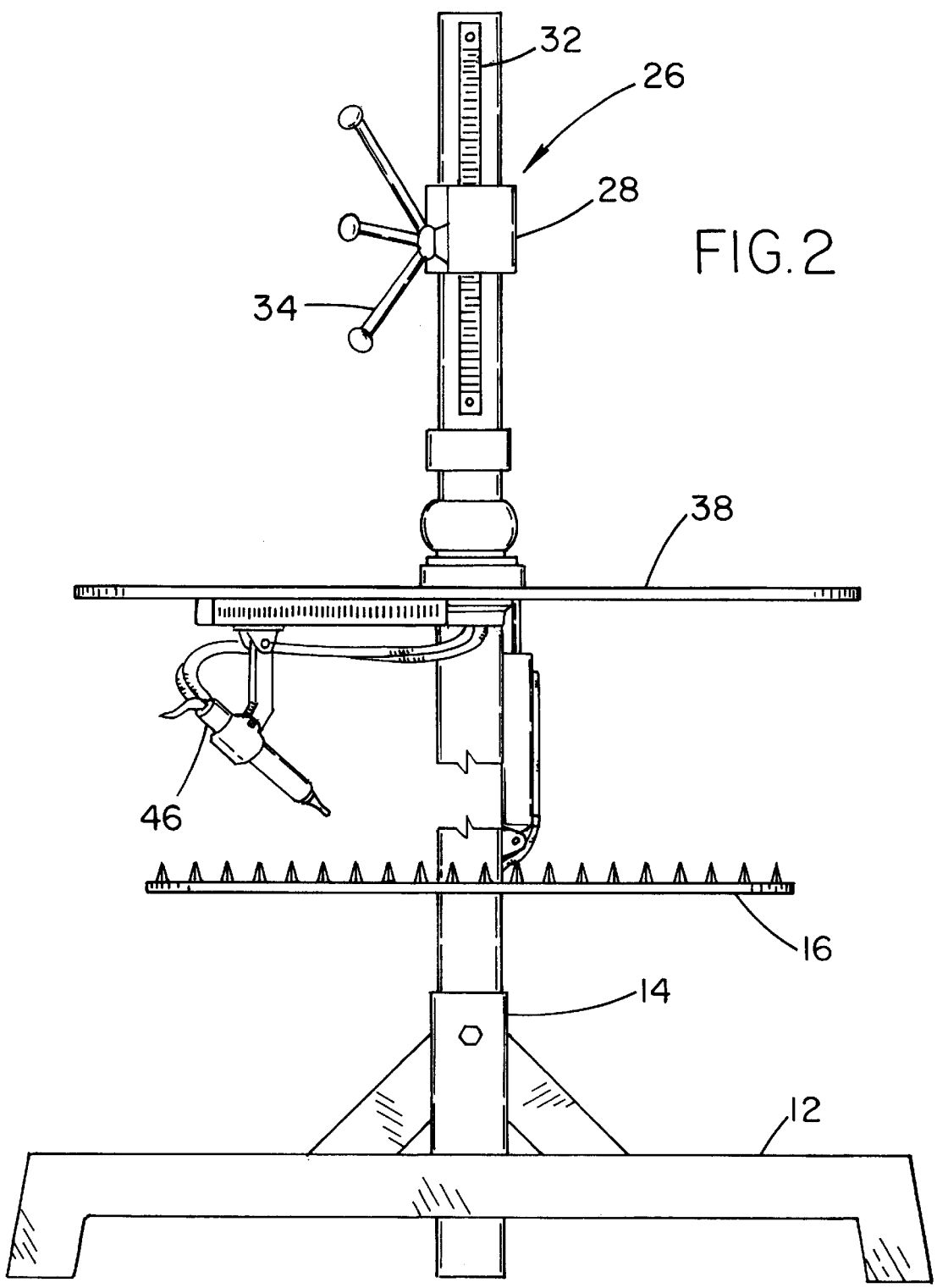
FIG. 2 is a side view of the present invention.

With reference now to the drawings, and in particular to FIGS. 1 through 3 thereof, a new versatile cutting torch system embodying the principles and concepts of the present invention and generally designated by the reference numeral 10 will be described.

The present invention, designated as numeral 10, includes a base 12 having four legs and a central telescoping post 14. A top end of the post has a horizontally oriented table 16 fixedly secured thereon. As shown in FIGS. 1 & 2, the table has a plurality of teeth formed on a top face thereof. In use, a height of the table is adjustable by way of a bolt.

Next provided is a generally C-shaped mounting arm 17 including a lower extent 18 fixedly coupled to the base. An upper extent 19 is pivotally coupled to the lower extent about a horizontal axis. For affording control over a lateral shifting of the upper extent with respect to the lower extent and the base, a hydraulic cylinder 20 is mounted between the upper and lower extents.

In an alternate embodiment, as shown in FIG. 3, the base includes a gear track 21 in lieu of the telescoping post and table for engaging rotatable gears 22 of the C-shaped mounting arm such that the C-shaped mounting arm may be maneuvered along a length of the base. Bearings 24 are preferably included to facilitate such maneuvering. As shown in FIG. 3, such bearings reside in a plane which is skewed with respect to that in which the gears are situated. Further, a carriage on which the gears and bearings are mounted includes a slow motion motor for effecting the rotation of the gears.

Also included is a vertical adjustment assembly 26 including a sleeve 28 pivotally mounted to a top of the mounting arm about a horizontal axis. Such horizontal axis is perpendicular with respect to that of the mounting arm. As such, universal movement of the vertical adjustment assembly is afforded. A gauge is preferably included to measure an extent of such movement. Further, the vertical adjustment assembly includes a hydraulic cylinder 30 connected between the upper extent of the mounting arm and the sleeve for affording control over a shifting of the vertical assembly with respect to the remaining aforementioned components of the present invention.

The vertical adjustment assembly further includes a linear rack gear 32 slidably mounted within the sleeve. The linear rack gear is made adjustable by way of a rotating handle 34 positioned on the sleeve. For supporting any weight present on the linear rack gear, a spring 36 is connected between the sleeve and a bottom the linear rack gear. Note FIG. 1. A support bar 37 has a lower end coupled to a lower end of the linear rack gear and an upper extent slidably mounted within a channel formed adjacent to the sleeve 28.

Rotatably mounted to a bottom of the linear rack gear is a planar circular plate 38 which remains in concentric relationship therewith. It should be noted that the plate rotates about an axis of the linear rack gear. As shown in FIG. 1, a center point pin 40 is fixedly mounted to a bottom of the linear rack gear below the circular plate and depends downwardly therefrom in concentric relationship with the circular plate. For reasons that will soon become apparent, the pin has a sharpened lower end.

Also provided is a rotating control unit 42 including a radially extending bar 44 having an inboard end fixedly mounted adjacent to the bottom end of the linear rack gear. The radially extending bar extends from the linear rack gear in a spaced and parallel relationship with the circular plate. As shown in FIG. 1, the rotating control unit includes a roller wheel assembly 45 movable along a length of the radially extending bar. During operation, a wheel of the roller wheel assembly engages with an upper surface of the circular plate for rotating the same.

Finally, an oxy-acetylene cutting torch 46 is pivotally and slidably mounted on a radially extending member which is fixedly coupled to a lower surface of the circular plate. In use, the torch is angled downwardly for torching an item placed on the table and held in place via the teeth and pin. As shown in FIG. 1, a cable that connects the torch and any associated control mechanism is situated through an axial bore formed in the linear rack gear. In use, a user may control the operation of the hydraulic cylinders and roller wheel assembly by way of conventional control knobs and dials for affording versatile use of the torch.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A versatile torch assembly comprising, in combination:

a base including a central telescoping post mounted thereon with a top end having a horizontally oriented table fixedly mounted thereon having a plurality of teeth formed on a top face thereof, whereby a height of the table is adjustable;

a generally C-shaped mounting arm including a lower extent fixedly coupled to the base and an upper extent pivotally coupled to the lower extent about a horizontal axis with a hydraulic cylinder mounted therebetween for effecting a lateral shifting of the upper extent with respect to the lower extent and the base;

a vertical adjustment assembly including a sleeve pivotally mounted to a top of the mounting arm about a horizontal axis which is perpendicular with respect to that of the mounting arm, the vertical adjustment assembly further including a hydraulic cylinder connected between the upper extent of the mounting arm and the sleeve, the vertical adjustment assembly further including a linear rack gear slidably mounted within the sleeve and adjustable therein by way of a rotating handle positioned on the sleeve, wherein a spring is connected between the sleeve and the linear rack gear;

a planar circular plate rotatably mounted to a bottom of the linear rack gear in concentric relationship therewith, wherein the plate rotates about an axis of the linear rack gear;

a center point pin fixedly mounted to a bottom of the linear rack gear below the plate and depending downwardly therefrom in concentric relationship with the circular plate, the pin having a sharpened lower end;

a rotating control unit including a radially extending bar having an inboard end fixedly mounted adjacent to a lower end of the linear rack gear and extending therefrom in a spaced and parallel relationship with the circular plate, the rotating control unit further including a roller wheel assembly movable along a length of the radially extending bar, the roller wheel assembly including a wheel engaged with an upper surface of the circular plate for rotating the same; and a torch pivotally and slidably mounted on a radially extending member fixedly coupled to a lower surface of the circular plate, the torch angled downwardly for cutting purposes.

2. A versatile torch assembly comprising:

a base;

a mounting arm coupled on the base;

a plate rotatably coupled with respect to the mounting arm;

a rotating control unit is in engagement with the plate for effecting the rotation of the plate and torch; and a torch mounted on the plate for cutting purposes.

3. A versatile torch assembly as set forth in claim 2 wherein the torch is pivotally and slidably mounted to the plate.

4. A versatile torch assembly as set forth in claim 2 wherein a pin is coupled to a center of the plate and depends downwardly therefrom.

5. A versatile torch assembly as set forth in claim 2 wherein the plate and torch are secured to a vertical adjustment assembly which is in turn coupled to the mounting arm.

6. A versatile torch assembly as set forth in claim 2 wherein the mounting arm includes a lower extent pivotal with respect to an upper extent for allowing lateral shifting of the plate and torch.

7. A versatile torch assembly as set forth in claim 2 wherein the mounting arm is slidably mounted on the base.

8. A versatile torch assembly as set forth in claim 2 wherein a table is mounted on the base for supporting an item to be cut.

9. A versatile torch assembly as set forth in claim 8 wherein the table is vertically adjustable with respect to said base.

\* \* \* \* \*